United States Patent [19]
Mori et al.

[11] Patent Number: 5,341,171
[45] Date of Patent: Aug. 23, 1994

[54] VIDEO CAMERA APPARATUS WITH A CONNECTING DEVICE FOR EASY CONNECTION WITH ELECTRIC APPARATUS

[75] Inventors: Akinari Mori, Tokyo; Yoshisada Okayasu; Toshinori Suzuki, both of Kanagawa; Takehiko Suzuki, Tokyo, all of Japan

[73] Assignee: Sony Corporation, Japan

[21] Appl. No.: 926,169

[22] Filed: Aug. 7, 1992

[30] Foreign Application Priority Data

Aug. 23, 1991 [JP] Japan .................................. 3-212063
Aug. 23, 1991 [JP] Japan .................................. 3-212064

[51] Int. Cl.$^5$ ...................... H04N 5/225; H04N 5/232
[52] U.S. Cl. ...................................... 348/373; 348/375
[58] Field of Search ................ 358/209, 909, 229, 906; H04N 5/225, 5/26

[56] References Cited

U.S. PATENT DOCUMENTS

| | | | |
|---|---|---|---|
| 4,499,504 | 2/1985 | Edakubo et al. | 358/335 |
| 5,073,823 | 12/1991 | Yamada et al. | 358/909 |
| 5,121,147 | 6/1992 | Wada et al. | 358/209 |

FOREIGN PATENT DOCUMENTS

| | | | |
|---|---|---|---|
| 3931243 | 3/1990 | Fed. Rep. of Germany . | |
| 3236688 | 10/1991 | Japan | H04N 5/225 |
| 3276974 | 12/1991 | Japan | H04N 5/225 |
| 3280787 | 12/1991 | Japan | H04N 5/225 |
| 3284068 | 12/1991 | Japan | H04N 5/225 |
| 3286684 | 12/1991 | Japan | H04N 5/225 |
| 4196981 | 7/1992 | Japan | H04N 5/225 |

OTHER PUBLICATIONS

European Search Report; Patent Abstracts of Japan, vol. 6, No. 55, Apr. 10, 1982 Patent Abstracts of Japan, vol. 14, No. 400, Aug. 29, 1990; Patent Abstracts of Japan, vol. 7, No. 127, Jun. 3, 1983; Research Disclosure No. 182, Jun. 1979, Pat. Abstracts of Japan, vol. 16, No. 104, Mar. 13, 1992.

Primary Examiner—Joseph Mancuso
Assistant Examiner—Wendy R. Greening
Attorney, Agent, or Firm—Ronald P. Kananen

[57] ABSTRACT

A video camera apparatus including a video camera device, a battery for supplying electric energy to the video camera device, an adapter detachably mounted in the video camera device to connect the video camera device with the battery, and a connecting device. The video camera device may be attached to the base unit and thereby be connected with another electrical apparatus, such as a VCR.

15 Claims, 10 Drawing Sheets

VIDEO CAMERA APPARATUS WITH A CONNECTING DEVICE FOR EASY CONNECTION WITH ELECTRIC APPARATUS

BACKGROUND OF THE INVENTION

The present invention relates to a video camera recorder, and more specifically to a video camera apparatus with a connecting device for detachably connecting the video camera recorder with electric apparatus such as a television or a video tape recorder.

Generally, information recorded on a recording medium by a video camera recorder is reproduced by a television or dubbed by a video tape recorder. Upon reproducing or dubbing of the information, the video camera recorder is connected via a plurality of cables with the television or video tape recorder. Electric power for energization of the video tape recorder is supplied from a battery detachably mounted on the video camera recorder or from an AC power source via an AC adapter during reproducing for a relatively long period. The adapter is also usable for charging the battery.

However, the use of the cables causes the connecting operation between the video camera recorder and the television or video tape recorder to be troublesome and erroneous. In addition, every time the battery is charged by using the adapter, the battery is disconnected from the video camera recorder prior to setting on the adapter. Such a charging operation of the battery is also troublesome.

There is a great demand for a video camera recorder and a connecting device attachable thereto for the easy connection/disconnection of the video camera recorder with electric apparatus the readily charging of a battery for the video camera recorder.

SUMMARY OF THE INVENTION

A principal object of the present invention is to provide a video camera apparatus with a connecting device which is adapted for readily connecting and disconnecting with another electric apparatus.

Another object of the present invention is to provide a video camera apparatus with a connecting device capable of automatically charging a battery.

The present invention provides a video camera apparatus comprising a video camera device for recording video and audio information on a recording medium. The video camera device has power supply terminals through which electric energy is supplied, video and audio signal terminals through which video and audio signals are transmitted, and a remote control signal terminal through which a remote control signal is transmitted. The video camera apparatus also includes a battery having power supply terminals through which electric energy is supplied to the video camera device, and an adapter detachably mounted on the video camera device to connect the video camera device with the battery. The adapter has a video camera device mounting site where the video where the battery is mounted. The video camera device mounting site and the battery mounting site each have power supply terminals through which the electric energy of the battery is supplied to the video camera device and video and audio signal terminals through which video and audio signals are transmitted. Further, the video camera apparatus is provided with a connecting device for detachably mounting the video camera device thereon to connect the video camera device with electric apparatus. The connecting device includes a housing which is provided with a battery mounting site where the battery is detachably mounted and an adapter mounting site where the adapter is detachably mounted. The battery mounting site of the connecting device has power supply terminals connected with the power supply terminals of the battery. The adapter mounting site of the connecting device has power supply terminals connected with the power supply terminals of the adapter, and video and audio signal terminals connected with the video and audio signal terminals of the adapter.

DESCRIPTION OF THE PREFERRED EMBODIMENT

Figure 1:
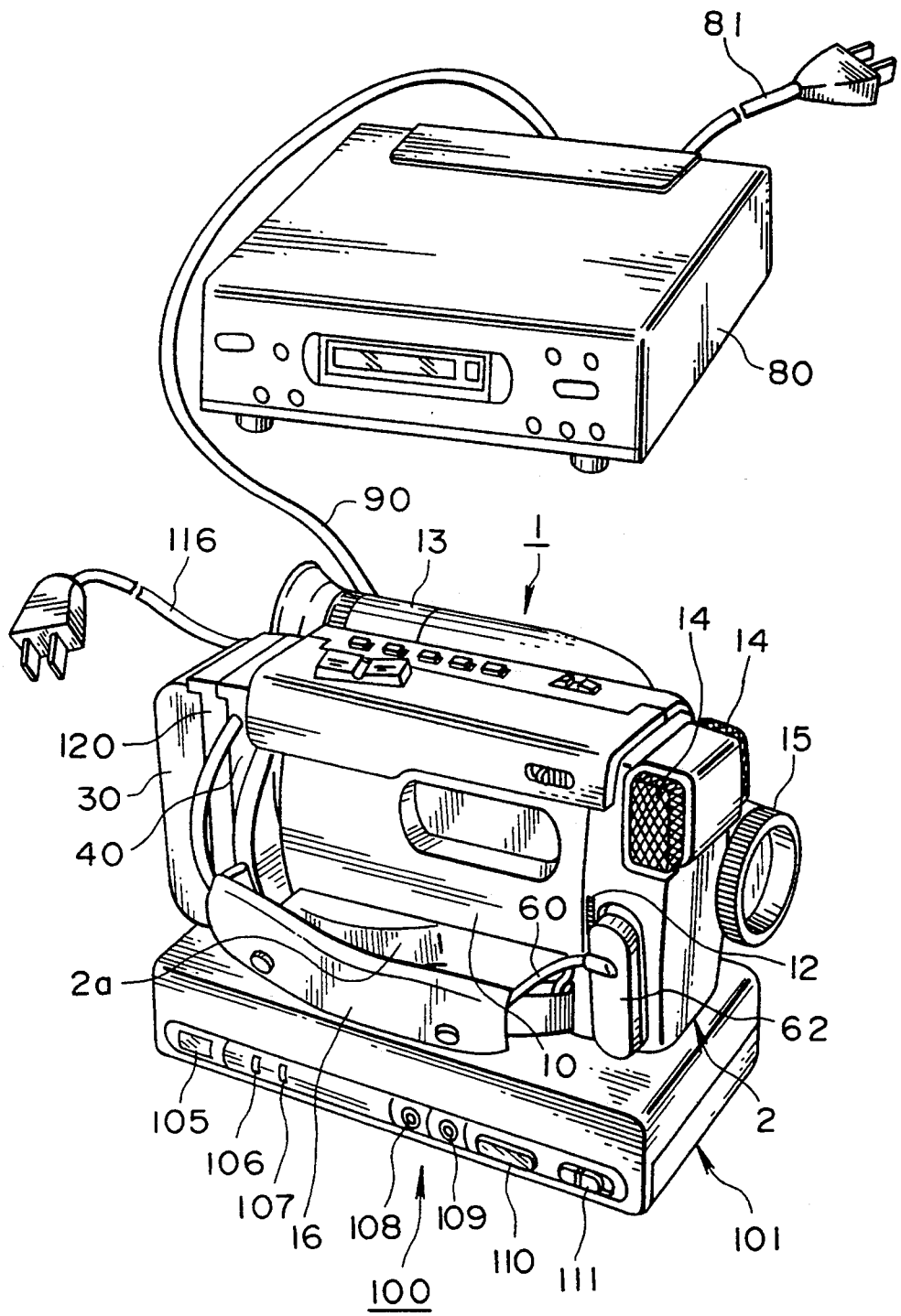
FIG. 1 is a perspective view of one preferred embodiment of a video camera apparatus according to the present invention, which includes a video camera recorder connected through a connecting device with a video tape recorder.

Referring now to FIG. 1, there is shown one preferred embodiment of a composite video camera apparatus according to the present invention. As shown in FIG. 1, the composite video camera apparatus comprises a video camera recorder 1 with a box-like housing 2.

Figure 2:
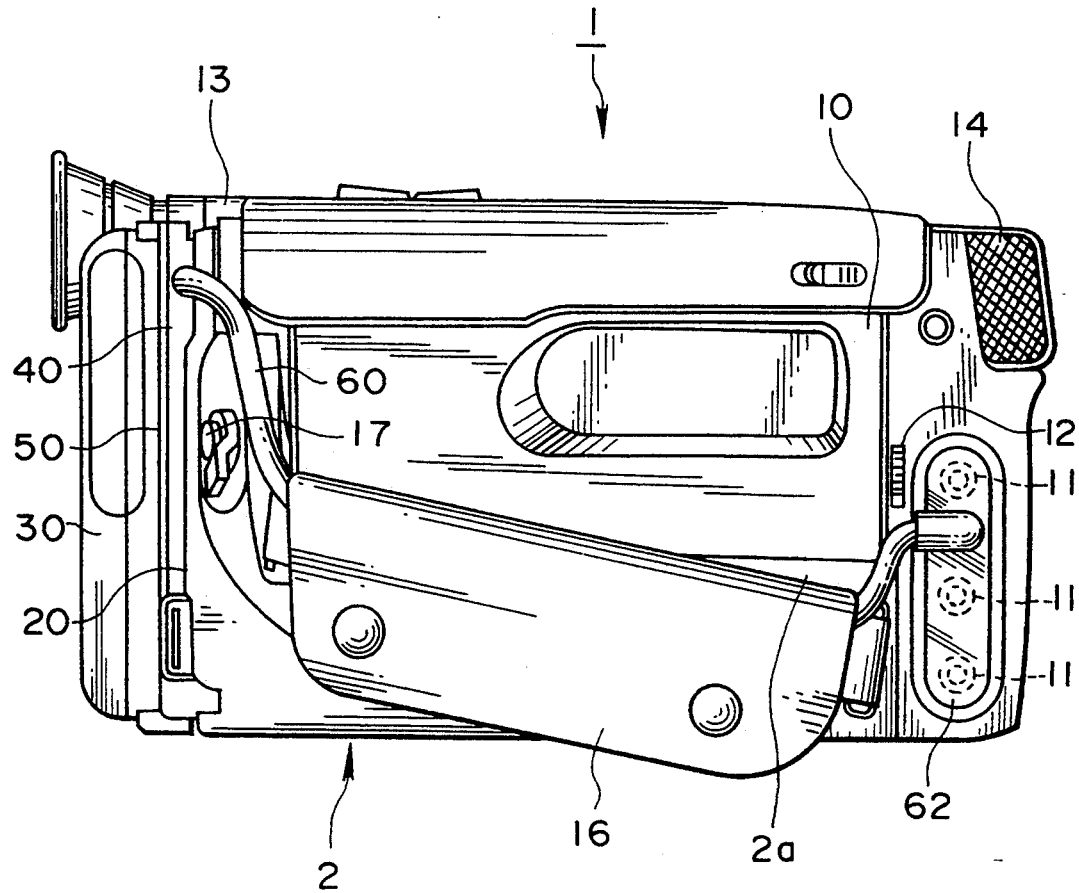
FIG. 2 is a side view of the video camera apparatus, in which a battery is attached through an adapter to the video camera recorder.

As shown in FIG. 2, a right side wall of the housing 2 is formed with a grip portion 2a outwardly projecting therefrom. Inside the right side wall is disposed a tape deck 10. A grip belt 16 is attached at both lower ends of the grip portion 2a. The grip belt 16 extends over the grip portion 2a to support a hand of an operator upon grasping the grip portion 2a. A recording push-button 17 is arranged on a rear portion of the grip portion 2a so as to be actuated by a thumb of the operator. Disposed on a front portion of the right side wall are video and audio signal terminals 11 through which video and audio signals are transmitted to and from the video camera recorder 1. A video and audio signal input/output switch 12 is arranged adjacent the terminals 11 to serve for changeover of input/output modes for the video and audio signals to be transmitted to the terminals 11. As best shown in FIG. 1, a view finder 13 is disposed on a left side wall of the housing 2. A pair of microphones 14 are opposingly disposed on the front portions of the side walls. A lens barrel 15 is mounted on a front end wall of the housing 2 and below the microphones 14 as shown in FIG. 1.

Figure 3:
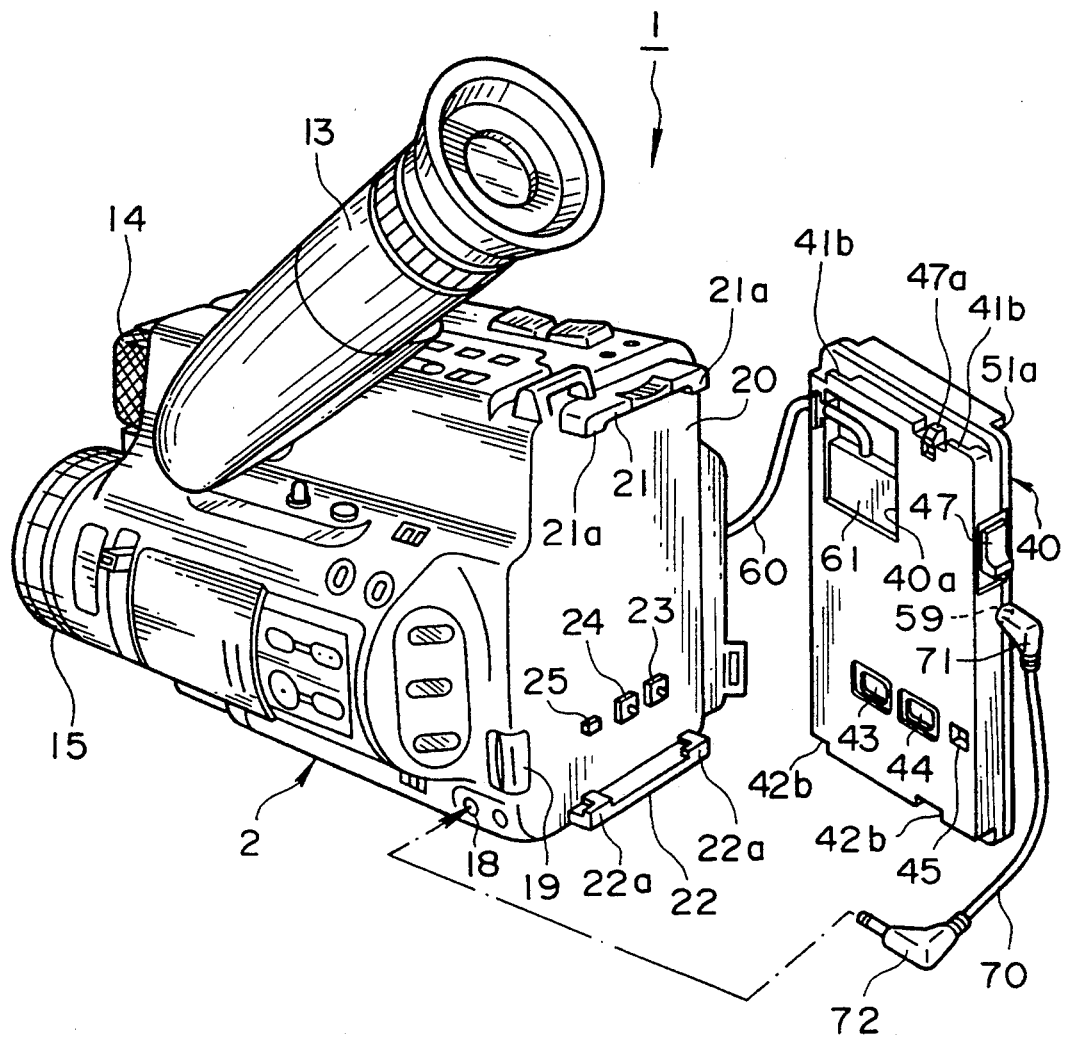
FIG. 3 is a perspective view of the video camera recorder disconnected with the adapter.

As shown in FIG. 3, a remote control terminal 18 is arranged on a rear portion of the left side wall of the housing 2. A battery release lever 19 is disposed adjacent the remote control terminal 18 at a rearmost portion of the left side wall.

As shown in FIG. 3, a rear end wall of the housing 2 of the video camera recorder 1 serves as a battery mounting site 20. The battery mounting site 20 is formed with jaws 21 and 22 which project rearwardly from upper and lower peripheries thereof. The respective jaws 21 and 22 have at both ends thereof L-shaped pawls 21a and 22a. The rear end wall 20 is provided with pin-like power supply terminals 23 and 24 projecting rearwardly therefrom and a rectangular pawl 25. The pawl 25 is operatively connected with the battery release lever 19 so as to project from the rear end wall 20 due to operation of the battery release lever 19.

Figure 9:
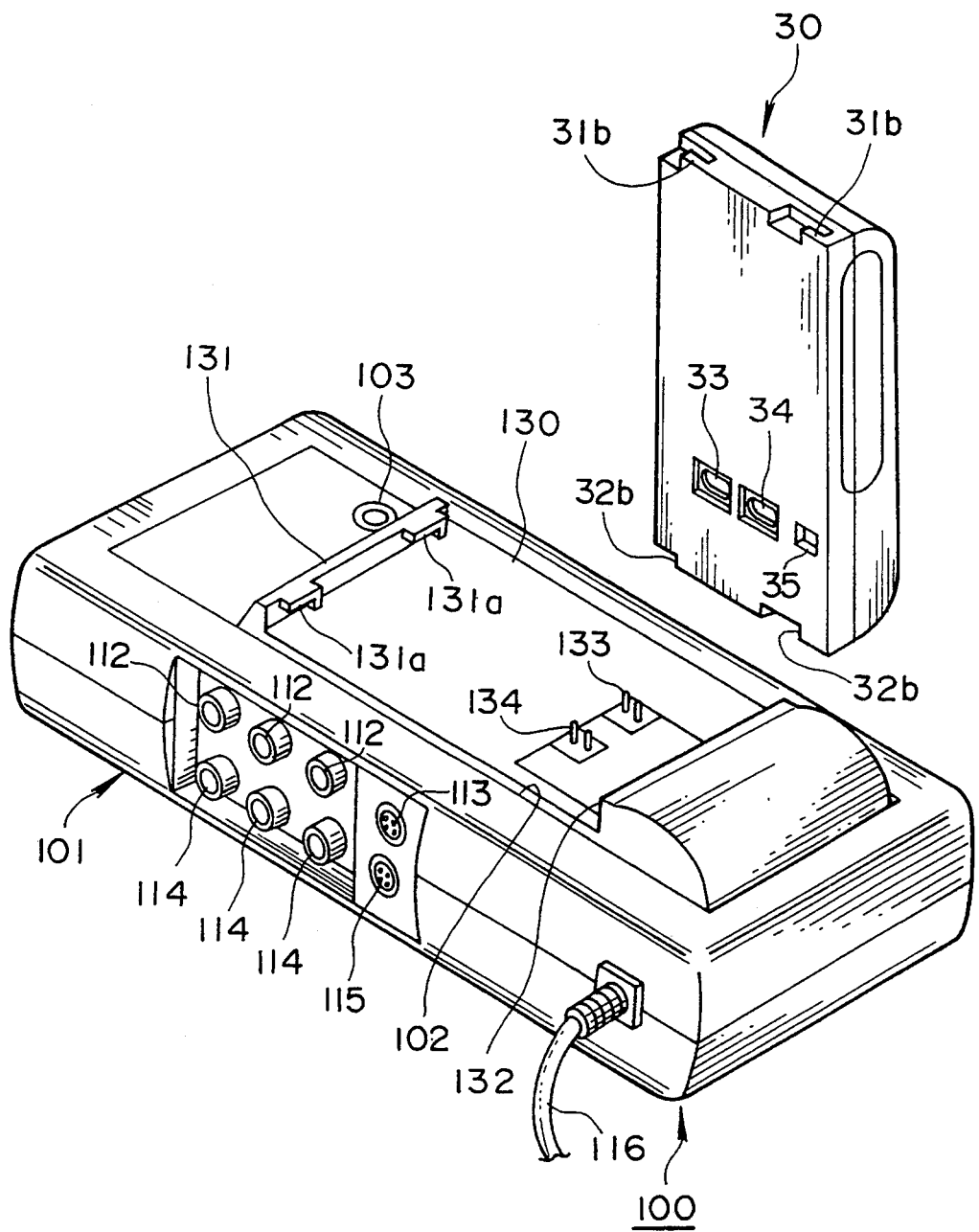
FIG. 9 is an enlarged perspective view of the connecting station, in which the folding panel is disposed in a closed position.

Detachably mounted on the battery mounting site 20 of the housing 2 of the video camera recorder 1 is a battery 30 or an adapter 40. As shown in FIG. 9, the battery 30 is of a substantially rectangular shape and has an inner wall which abuts against the battery mounting site 20 upon mounting. The inner wall of the battery 30 is formed, at upper and lower edges thereof, with L-shaped notches 31b and 32 which engage the pawls 21a and 22a on the battery mounting site 20, respectively, upon mounting the battery 30. Disposed on the inner wall of the battery 30 are metal contact pieces 33 and 34 and a rectangular opening 35. Upon mounting the battery 30, the contact pieces 33 and 34 are matingly connected with the power supply terminals 23 and 24 on the battery mounting site 20 of the video camera recorder 1. Electric energy is supplied from the battery 30 to the video camera recorder 1. Fitted to the rectangular opening 35 is the pawl 25 of the battery release lever 19 of the video camera device 1, so that the battery 30 is locked on the battery mounting site 20. Thus, operations of attaching and removing the battery 30 are readily performed.

FIG. 2 shows the video camera recorder 1 connected via the adapter 40 with the battery 30.

Figure 4:
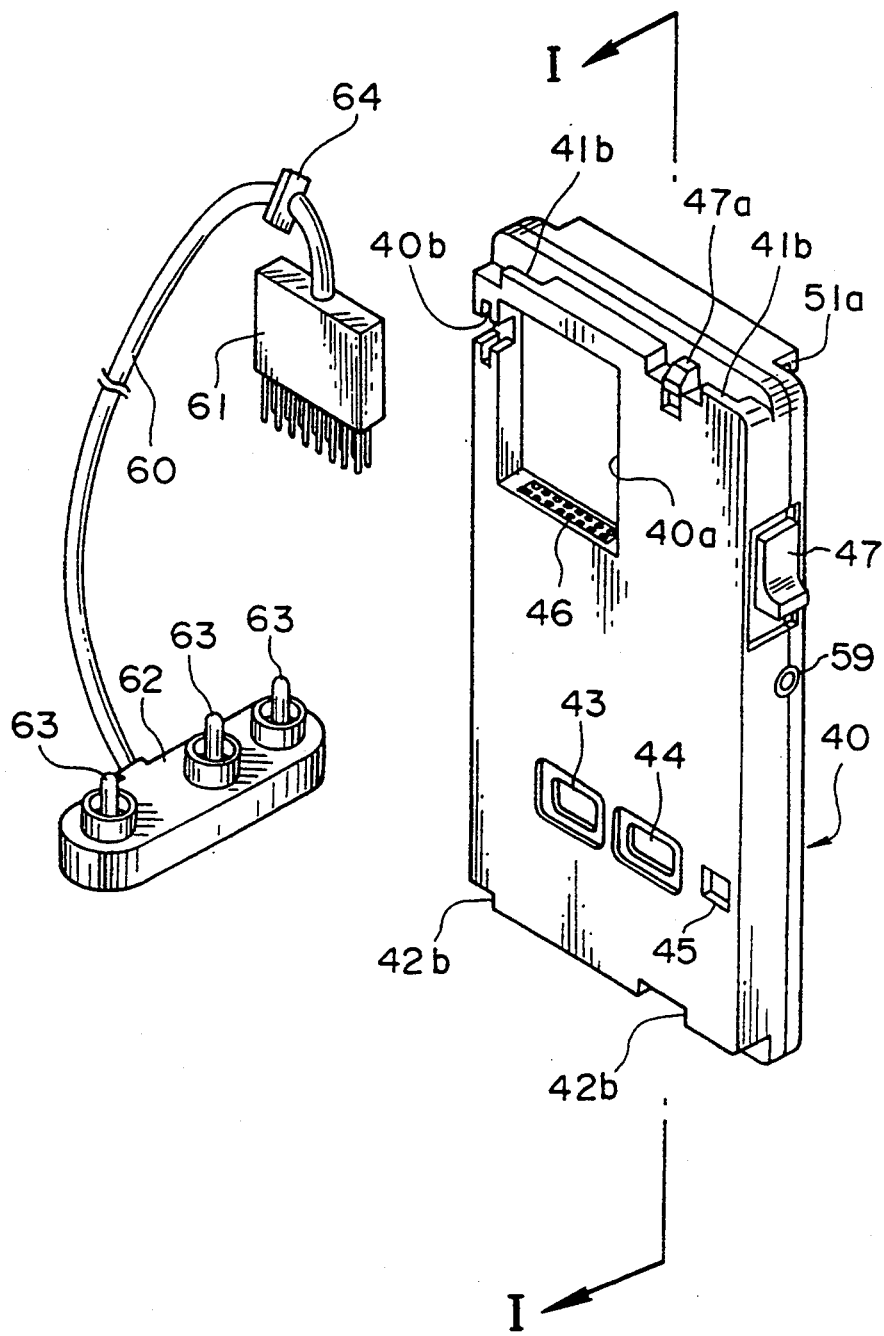
FIG. 4 is an enlarged perspective view of the adapter of FIG. 3, viewed from a front side thereof.

As shown in FIG. 4, the adapter 40 has a box-like housing made of synthetic resin and having front and rear walls. The front wall is formed, at upper and lower edges thereof, with L-shaped notches 41b and 42b which engage the pawls 21a and 22a, 22a on the battery mounting site 20 upon attaching the adapter 40 to the battery mounting site 20. Formed on the front wall is a rectangular opening 45 to which the pawl 25 of the battery release lever 19 of the video camera device 1 is fitted upon attaching. Thus, the adapter 40 is locked on the battery mounting site 20 due to engagements of the notches 41b and 42b with the pawls 21a and 22a and the opening 45 with the pawl 25. Metal contact pieces 43 and 44 are disposed on the front wall so as to be connected with the power supply terminals 23 and 24 on the battery mounting site 20 of the video camera recorder 1 upon attachment of the adapter 40. Formed at an upper portion of the front wall of the adapter 40 is a substantially rectangular recessed portion 40a and a notch 40b communicating with the recessed portion 40a and extending up to a peripheral edge of the front wall. The recessed portion 40a is provided, on a peripheral lower side thereof, with a female connector 46. The female connector 46 is connected with a male connector 61 of a cable 60, which is accommodated in the recessed portion 40a. The cable 60 is derived from the recessed portion 40a through the notch 40b to which a fastening member 64 is fitted to fixedly support the cable 60. The cable 60 is also provided with a plug 62 having three jack terminals 63, which are connected with the video and audio signal terminals 11 of the video camera recorder 1. Accordingly, the video camera recorder 1 and the adapter 40 are connected with each other by the cable 60 through which video and audio signals are transmitted between the video camera recorder 1 and the adapter 40. The cable 60 having a relatively large length enters into one end aperture of the grip belt 16 and derived from the other end aperture. At this time, the excess length of the cable 60 is held in a folded state in the grip belt 16 as shown in FIG. 2. Therefore, the recording pushbutton 17 is free from disturbance due to suspension of the cable 60 and thereby smoothly operated.

Figure 7:
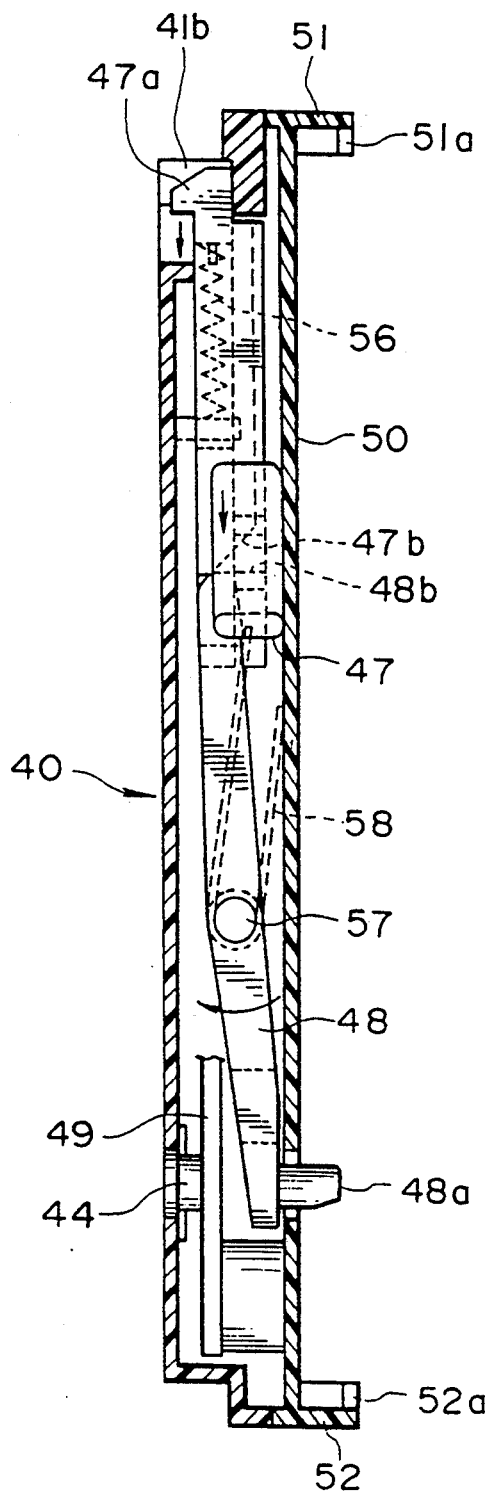
FIG. 7 is a sectional view of the adapter, taken along the line I—I of FIG. 4.

As shown in FIG. 4, the housing of the adapter 40 includes one side wall having an adapter release lever 47 which is slidable in a substantially vertical direction. The adapter release lever 47 is cooperated on its inside portion with a pawl 47a through a compression coil spring 56 which is mounted within the housing of the adapter 40 as seen in FIG. 7. Upon sliding the adapter release lever 47 upwardly, the compression coil spring 56 urges the pawl 47a upwardly to project toward inside of a notch which is formed adjacent one of the notches 41b of the front end wall. The provision of the pawl 47a of the adapter release lever 47 accomplishes double locking of the adapter 40 on the video camera recorder 1 in combination with the pawl 25 of the battery release lever 19. The side wall of the housing 2 of the adapter 40 also has, below the adapter release lever 47, a terminal 59 connected via a cable 70 with the remote control terminal 18 of the video camera recorder 1. As shown in FIG. 3, the cable 70 has both ends attached to plugs 71 and 72 which are fitted to the terminal 59 and the remote control terminal 18, respectively.

Figure 5:
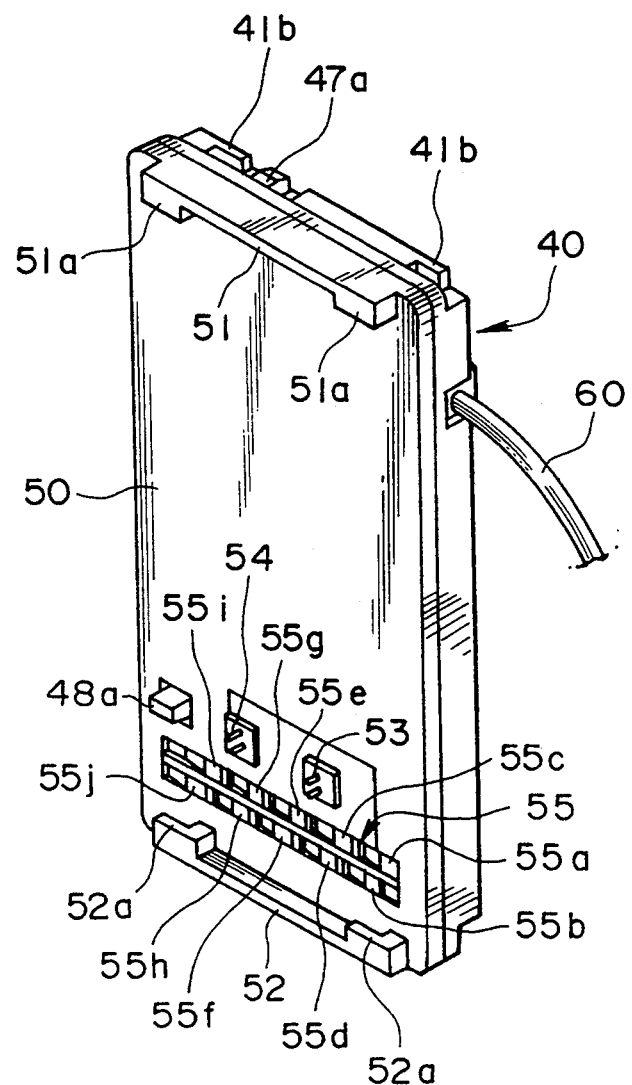
FIG. 5 is an enlarged perspective view of the adapter of FIG. 3, viewed from a rear side thereof.

FIG. 5 shows the rear wall of the housing of the adapter 40 which serves as a battery mounting site 50 on which the battery 30 or a connecting station as described below is mounted. The rear wall is formed, at upper and lower edges 51 and 52 thereof, with L-shaped pawls 51a and 52a which engage the notches 31b, and 30a, 32a of the battery 30 upon attaching the battery 30 to the battery mounting site 50. Power supply terminals 53 and 54 are disposed on the battery mounting site 50 so as to be connected with the contact pieces 33 and 34 of the battery 30 upon attachment of the battery 30. A rectangular pawl 48a projects rearwardly from the battery mounting site 50.

As best shown in FIG. 7, the pawl 48a is disposed on one end of an oscillating lever 48 which is pivotted around a rod 57. Mounted on the rod 57 is a spring 58, as shown in a dotted line in FIG. 7, which biasses the oscillating lever 48 counterclockwise. The other end 48b of the oscillating lever 48 engages a tapered face 47b formed on an inner portion of the adapter release lever 47. When the adapter release lever 47 slides downwardly as indicated by an arrow in the drawing, the tapered face 47b urges the end 48b of the oscillating lever 48 rearwardly. The oscillating lever 48 rotates in a clockwise direction, as indicated by an arrow in the drawing, which is reverse to the direction of the biassing force of the spring 58. As a result, the pawl 48a of the oscillating lever 48 is retracted inside the housing of the adapter 40. However, in this case the adapter 40 is not detached from the video camera recorder 1 because the locking condition of the battery release lever 19 is still maintained. Only simultaneous operation of the battery release lever 19 and the adapter release lever 47 accomplishes removal of the adapter 40 from the video camera recorder 1. Thus, the double locking prevents the adapter 40 from removal from the video camera recorder 1 due to careless operation by an operator during recording or reproducing.

Figure 6:
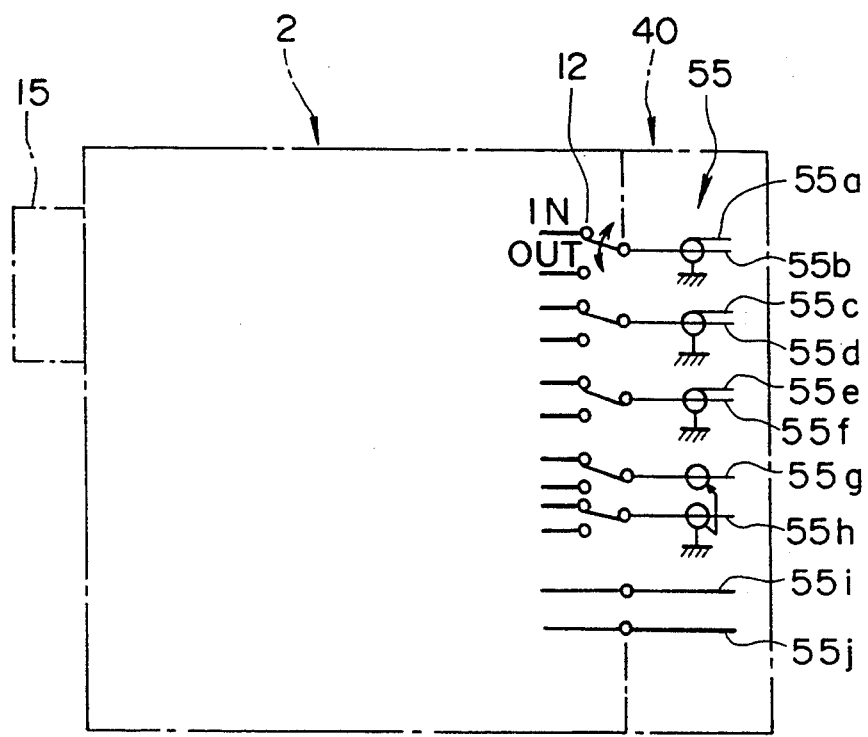
FIG. 6 is a circuit diagram showing an electric connection between a video and audio signal input/output switch of the video camera recorder and a terminal array of the adapter.

As shown in FIG. 5, a terminal array 55 is arranged on the battery mounting site 50 of the housing of the adapter 40. The terminal array 55 includes metal contact pieces 55a, 55b, 55c, 55d, 55e, 55f, 55g, 55h and 55i which are used for input/output of various signals of Y (luminance), G (ground) Y, C (chroma), GC, V (video), GV, AL (audio on left), AR (audio on right), Control, respectively, and a supplementary contact piece 55j. The contact pieces 55a to 55h of the terminal array 55 are connected to the video and audio signal input/output switch 12 of the housing 2 of the video camera recorder 1 as shown in FIG. 6. The terminal array 55, the power supply terminals 53 and 54 and the contact pieces 43 and 44 are all disposed on a circuit board 49 which is secured within the housing of the adapter 40 as seen in FIG. 7. The terminal array 55 is adapted for connection with a terminal array 125 of the connecting station 100 as seen in FIG. 8.

The connecting station 100 will be described hereinafter, which connects the video camera recorder 1 via a cable 90 with another electric apparatus, for example, a video tape recorder 80 as seen FIG. 1.

Figure 8:
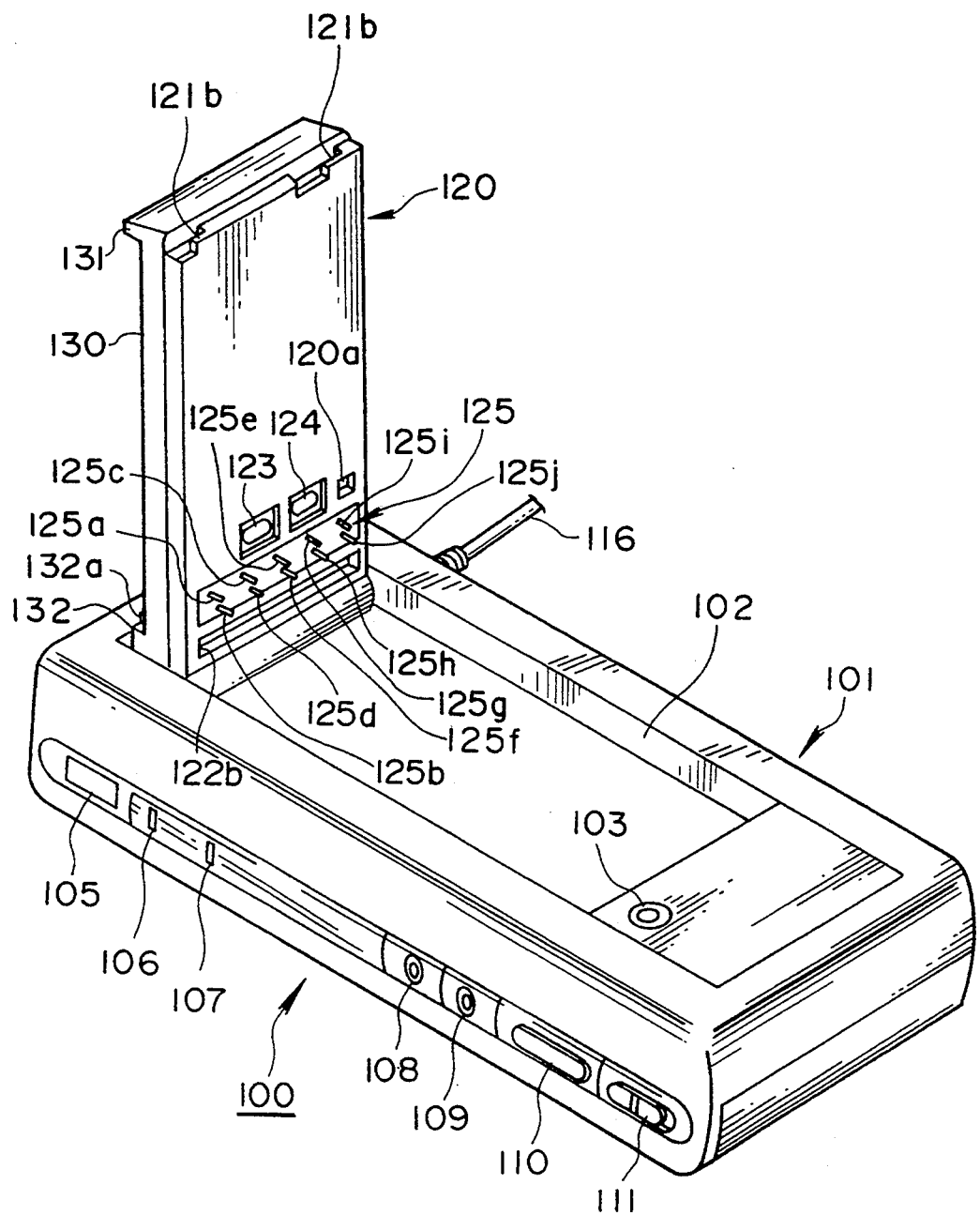
FIG. 8 is an enlarged perspective view of a connecting station, in which a folding panel of a housing of the connecting station is disposed in an upstanding position.

As shown in FIG. 8, the connecting station 100 comprises a box-like housing 101 made of synthetic resin. The housing 101 has a top wall on which a substantially rectangular recess 102 and a DC output terminal 103 adjacent the recess 102 are provided. The DC output terminal 103 is connected via a DC power cable (not shown) with an AC power source (not shown) in the case of using the AC power source for energizing the video camera recorder 1. A part of the top wall serves as a folding panel 120 which has such a size as fittable into the recess 102 upon folding. A rear end of the folding panel 120 is pivotally supported at a rear end portion of the recess 102 by hinges (not shown) whereby the folding panel 120 is rotated between the closed and upstanding positions. In the upstanding position, an inside back face of the folding panel 120 abuts against the battery mounting site 50 of the adapter 40 attached to the video camera recorder 1. At this time, the video camera recorder 1 with the adapter 40 fittably rests on a peripheral portion along the recess 102 of the housing 101 of the connecting station 100. The inside back face of the folding panel 120 is formed, at upper and lower end portions thereof, with L-shaped notches 121b and an elongated groove 122b which engage the pawls 51a, 51a and 52a, 52a of the battery mounting site 50 of the adapter 40 upon attaching the adapter 40 to the folding panel 120. Formed on the inside back face of the folding panel 120 is a rectangular opening 120a to which the pawl 48a projecting from the battery mounting site 50 is fitted upon mounting the adapter 40. Thus, the adapter 40 connected with the video camera recorder 1 is locked on the folding panel 120 due to the respective engagements of the notches 121b, with the pawls 51a and the groove 122b with the pawls 52a. Metal contact pieces 123 and 124 are disposed on the inside back face of the folding panel 120 so as to be connected with the power supply terminals 53 and 54 of the battery mounting site 50 of the adapter 40 upon mounting the adapter 40. The terminal array 125 is also disposed on the inside back face of the folding panel 120. The terminal array 125 includes pin-like terminals 125a, 125b, 125c, 125d, 125e, 125f, 125g, 125h, 125i and 125j which connect the corresponding contact pieces 55a to 55i of the terminal array 55 of the adapter 40, respectively, upon mounting the adapter 40.

As shown in FIG. 8, one side wall of the housing 101 of the connecting station 100 is provided with a remote control signal sensing member 105, a red standby lamp 106, a green main lamp 107, a red refreshing lamp 108, an orange charging lamp 109, a skip switch 110 and a video and audio signal output/input switch 111.

Figure 10:
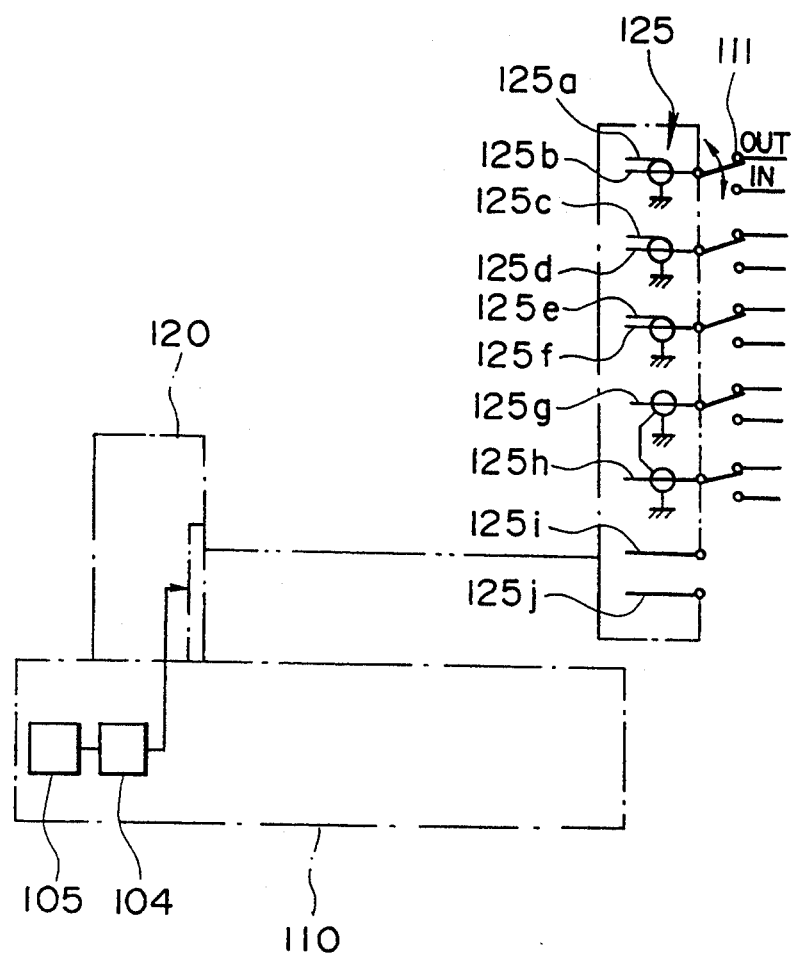
FIG. 10 is a circuit diagram showing an electric connection of a terminal array, a remote control signal sensing member and a video and audio signal output/input switch which are disposed on the connecting station.

As seen in FIG. 10, the remote control signal sensing member 105 is connected via a converter 104 to the terminal 125i of the terminal array 125 provided on the folding panel 120. Accordingly, a video camera recorder without means for receiving a remote control signal can be remote-controlled by connecting with the connecting station 100 having the remote control signal sensing member 105. The terminals 125a to 125h of the terminal array 125 are connected to the video and audio signal output/input switch 111 arranged on the side wall of the housing 101. The video and audio signal output/input switch 111 is manually actuated for changeover of output and input of the video and audio signals as well as the video and audio signal input/output switch 12 of the video camera recorder 1. The video and audio signal output/input switch 111 may be automatically actuated by provision of means for mechanically or electrically detecting changeover of the video and audio signal input/output switch 12.

FIG. 9 shows the folding panel 120 in the closed position. An outside face of the folding panel 120, as shown in FIG. 8, serves for a battery mounting site 130. As seen in FIGS. 8 and 9, the battery mounting site 130 is formed, at opposite end portions thereof, with L-shaped pawls 131a and 132a. The pawls 131a and 132a are engaged with the notches 31b and 32b of the battery 30 upon mounting the battery 30 on the battery mounting site 130. The battery 30 is readily locked or unlocked on the battery mounting site 130 by making or releasing the engagement of the notches 31b and 32b with the pawls 131a and 132a of the battery mounting site 130. Pin-like like terminals 133 and 134 are disposed on the battery mounting site 130 so as to be connected with the metal contact pieces 33 and 34 of the battery 30 upon mounting of the battery 30. Derived from the other side wall of the housing 101 of the connecting station 100 is an AC power cable 116 which is connected to the AC power source. When the connecting station 100 is connected via the cable 116 to the AC power source, the stand by lamp 106 on the side wall lights on. Subsequently, the refreshing lamp 108 lights upon mounting the battery 30 on the folding panel 120 in the closed position as shown in FIG. 9. The battery 30 starts to be refreshed. When the refreshing operation of the battery 30 is completed, the charging lamp 109 lights and then charging operation of the battery 30 starts. The charging operation of the battery 30 is completed and then the lamp 109 is turned off. In case of lack of capacitance of the battery 30, the battery 30 is immediately charged, skipping the refreshing operation.

As shown in FIG. 9, on the side wall of the housing 101 of the connecting station 100, video and audio output terminals 112 and an S video output terminal 113 are arranged in an upper row and video and audio input terminals 224 and an S video input terminals 115 in a lower row. Upon dubbing information recorded by the video camera recorder 1, the output terminals 112 are connected via the cable 90 with the video tape recorder 80 as shown in FIG. 1, while the video and audio signal output/input switch 111 is shifted to the output position. Upon reproducing the information, the output terminals 112 are connected via the cable 90 with a television. In the case of recording the information from the television, the input terminals 114 are connected via the cable 90 with the television.

Further, upon connecting the battery 30 and the adapter 40 attached to the video camera recorder 1, with the folding panel 120 as seen in FIG. 1, a charging operation of the battery 30 is automatically performed by detecting the turning off of a power switch (not shown) of the video camera recorder 1. On the other hand, when turning on the power switch of the video camera recorder 1, the charging operation of the battery 30 is interrupted.

As is appreciated from the above description, a battery mounting site 20 of the video camera recorder 1 may be provided with terminals for input/output of video, audio and control signals together with the power supply terminals, so that the video camera recorder 1 can be attached to the holding panel 120 of the connecting station 100 without mounting the adapter 40.

What is claimed is:

1. An adapter apparatus contained in a housing for detachably connecting a video camera device with a battery, comprising:
    a first side having a video camera device mounting site for detachably mounting the video camera device said video camera device mounting site having power supply terminals and video and audio signal terminals connectable respectively to power supply terminals and video and audio signal terminals of the video camera device;
    a second side having a battery mounting site for detachably mounting the battery said battery mounting site having power supply terminals which are connectable respectively to power supply terminals of the battery; and
    a third side provided with a remote control signal terminal connectable to a remote control signal terminal of the video camera device.

2. An adapter apparatus as claimed in claim 1, wherein said video and audio signal terminals of the video camera device mounting site are connected via a cable with said video and audio signal terminals of the video camera device.

3. An adapter apparatus as claimed in claim 2, wherein said cable is passed through a tubular grip belt which is attached to the video camera device whereby the video camera device may be stably held.

4. A connecting device contained in a housing for detachably mounting a video camera device thereon to couple the video camera device to an electric apparatus, comprising:
    a battery mounting site for detachably mounting a battery, said battery mounting site having power supply terminals connectable to the power supply terminals of the battery; and
    an adapter mounting site for detachably mounting an adapter, said adapter mounting site having power supply terminals, video and audio signal terminals and a remote control signal terminal which are connectable respectively to power supply terminals, video and audio signal terminals and a remote control signal terminal of the adapter.

5. A connecting device as claimed in claim 4, wherein said housing of said connecting device has means for sensing a remote control signal.

6. A video camera apparatus comprising:
    a video camera device for recording video and audio information on a recording medium, the video camera device including power supply terminals, video and audio signal terminals, and a remote control signal terminal;
    a battery having power supply terminals for supplying electric energy to the video camera device through said power supply terminals of the camera; and
    an adapter detachably mountable onto the video camera device, the adapter including a remote control signal terminal connectable to the remote control signal terminal of said video camera device, a first mounting site for detachably mounting the adapter to the video camera device, and a second mounting site for detachably connecting the battery to the adaptor;
    wherein said first mounting site includes means for detachably mounting said adapter on said video camera device, first power supply terminal, and video and audio signal terminals, whereby said first power supply terminals and said video and audio signal terminals are coupled respectively to said power supply terminals and said video and audio signal terminals of the video camera device when said adapter is mounted on the video camera device; and
    wherein said second mounting site includes means for detachably mounting the battery on the adaptor and second power supply terminals, whereby said power supply terminals of the battery is coupled to said second power supply terminals when the battery is mounted on the adaptor.

7. A video camera apparatus as claimed in claim 6 wherein said second mounting site of the adaptor further includes second video and audio terminals and a second remote control terminal, and the video camera apparatus further comprises:
    a connecting device for coupling the video camera device to an electric apparatus, said connecting device including a first mounting site for detachably connecting the connector to the adaptor and a second mounting site for detachably connecting the battery to the connector;
    wherein said first mounting site of the connecting device includes first power supply terminals, video and audio signal terminals, and a remote control signal terminal connectable respectively with said second power supply terminals, said second video and audio signal terminals and said second remote control signal terminal of said second mounting site of the adapter; and wherein said second mounting site of the connecting device includes second power supply terminals connectable with the power supply terminals of the battery, whereby the battery may be recharged by the connecting device.

8. A video camera apparatus as claimed in claim 6, wherein said video and audio signal terminals of said first mounting site of the adapter are coupled to said video and audio signal terminals of the video camera device with a cable.

9. A video camera apparatus as claimed in claim 8, wherein said cable is passed through a tubular grip belt which is attached to the video camera device whereby the video camera device may be stably held.

10. A video camera apparatus as claimed in claim 7, wherein the connecting device includes an opening and a folding member pivotable between an upstanding position and a closing position, said folding member being fittable into said opening in the closing position, and wherein said first mounting site and said second mounting site of the connecting device are located on opposite sides of the folding member.

11. A video camera apparatus as claimed in claim 7, wherein said connecting device has means for detecting a remote control signal.

12. A video camera apparatus as claimed in claim 8, wherein said cable is detachably connected at both ends thereof with the video and audio signal terminals of said first mounting site of the adapter and said video and audio signal terminals of said video camera device.

13. A connecting device contained in a housing for detachably mounting a video camera device thereon to couple the video camera device to an electric apparatus, comprising:
a battery mounting site for detachably mounting a battery, said battery mounting site having power supply terminals connectable to the power supply terminals of the battery; and
an adapter mounting site for detachably mounting an adapter, said adapter mounting site having power supply terminals, video and audio signal terminals and a remote control signal terminal which are connectable respectively to power supply terminals, video and audio signal terminals and a remote control signal terminal of the adapter,
wherein the connecting device includes an opening and a folding member pivotable between an upstanding position and a closing position, said folding member being fittable into said opening in the closing position, and wherein said first mounting site and said second mounting site of the connecting device are located on opposite sides of the folding member.

14. A connecting device contained in a housing for detachably mounting a video camera device thereon to couple the video camera device to an electric apparatus, comprising:
a battery mounting site for detachably mounting a battery, said battery mounting site having power supply terminals connectable to the power supply terminals of the battery; and
an adapter mounting site for detachably mounting an adapter, said adapter mounting site having power supply terminals, video and audio signal terminals and a remote control signal terminal which are connectable respectively to power supply terminals, video and audio signal terminals and a remote control signal terminal of the adapter,
wherein said housing of said connecting device has a direct current output terminal.

15. A connecting device contained in a housing for detachably mounting a video camera device thereon to couple the video camera device to an electric apparatus, comprising:
a battery mounting site for detachably mounting a battery, said battery mounting site having power supply terminals connectable to the power supply terminals of the battery; and
an adapter mounting site for detachably mounting an adapter, said adapter mounting site having power supply terminals, video and audio signal terminals and a remote control signal terminal which are connectable respectively to power supply terminals, video and audio signal terminals and a remote control signal terminal of the adapter,
wherein the battery is charged upon mounting on said battery mounting site.

* * * * *